(12) United States Patent
Sugata

(10) Patent No.: US 11,141,343 B2
(45) Date of Patent: Oct. 12, 2021

(54) WALKING TRAINING APPARATUS AND WALKING TRAINING METHOD THEREFOR

(71) Applicant: TOYOTA JIDOSHA KABUSHIKI KAISHA, Toyota (JP)

(72) Inventor: Hikaru Sugata, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 15/228,902

(22) Filed: Aug. 4, 2016

(65) Prior Publication Data

US 2017/0035642 A1 Feb. 9, 2017

(30) Foreign Application Priority Data

Aug. 7, 2015 (JP) .............................. JP2015-157349

(51) Int. Cl.
*A61H 3/00* (2006.01)
*A63B 24/00* (2006.01)
(Continued)

(52) U.S. Cl.
CPC ........... *A61H 3/008* (2013.01); *A61H 1/0262* (2013.01); *A61H 3/00* (2013.01);
(Continued)

(58) Field of Classification Search
CPC ........ A61H 3/008; A61H 3/00; A61H 1/0262; A61H 2205/10; A61H 2201/5069;
(Continued)

(56) References Cited

U.S. PATENT DOCUMENTS 6,666,831 B1 * 12/2003 Edgerton ............. A61H 1/0237
600/587
9,713,439 B1 * 7/2017 Wu .......................... A61B 5/11
(Continued)

FOREIGN PATENT DOCUMENTS

CN 101862255 A 10/2010
JP 2015-223294 A 12/2015
(Continued)

*Primary Examiner* — Andrew S Lo
*Assistant Examiner* — Shila Jalalzadeh Abyaneh
(74) *Attorney, Agent, or Firm* — Oblon, McClelland, Maier & Neustadt, L.L.P.

(57) ABSTRACT

A walking training apparatus includes a walking assistance apparatus attached to a leg of a user, a first pulling mechanism to pull the leg upward and forward, a controller configured to control the first pulling mechanism so that a vertically-upward component of a pulling force applied by the first pulling mechanism reduces a weight of the walking assistance apparatus, and a joint angle detector disposed in the walking assistance apparatus or an image pickup device to take an image of the leg of the user. The controller is configured to make the first pulling mechanism generate an additional pulling force in addition to the pulling force at a start of forward swinging of the leg or during a swinging period of the leg in a walking motion of the user, by using information detected by at least one of the joint angle detector and the image pickup device.

7 Claims, 8 Drawing Sheets

(51) Int. Cl.

| | | |
|---|---|---|
| *A63B 22/02* | (2006.01) | |
| *A61H 1/02* | (2006.01) | |
| *A63B 21/00* | (2006.01) | |
| *A63B 22/00* | (2006.01) | |
| *A63B 23/035* | (2006.01) | |
| *A63B 69/00* | (2006.01) | |
| *G06K 9/00* | (2006.01) | |

(52) U.S. Cl.
CPC .... *A63B 21/00181* (2013.01); *A63B 21/4035* (2015.10); *A63B 22/0046* (2013.01); *A63B 22/0087* (2013.01); *A63B 22/02* (2013.01); *A63B 22/0235* (2013.01); *A63B 23/03516* (2013.01); *A63B 24/0087* (2013.01); *A63B 69/0057* (2013.01); *G06K 9/00342* (2013.01); *A61H 2201/1215* (2013.01); *A61H 2201/1481* (2013.01); *A61H 2201/165* (2013.01); *A61H 2201/1621* (2013.01); *A61H 2201/1642* (2013.01); *A61H 2201/1652* (2013.01); *A61H 2201/5007* (2013.01); *A61H 2201/5069* (2013.01); *A61H 2205/10* (2013.01); *A63B 21/153* (2013.01); *A63B 69/0062* (2020.08); *A63B 2022/0094* (2013.01); *A63B 2209/10* (2013.01); *A63B 2220/05* (2013.01); *A63B 2220/16* (2013.01); *A63B 2220/34* (2013.01); *A63B 2220/803* (2013.01)

(58) Field of Classification Search
CPC ...... A61H 2201/1652; A61H 2201/165; A61H 2201/1642; A61H 2201/1621; A61H 2201/1481; A61H 2201/1215; A61H 2201/5007; A63B 21/4035; A63B 22/02; A63B 22/0087; A63B 23/03516; A63B 22/0046; A63B 21/00181; A63B 24/0087; A63B 69/0057; A63B 22/0235; A63B 2022/0094; A63B 2069/0062; A63B 21/153; A63B 2220/16; A63B 2220/34; A63B 2220/803; A63B 2209/10; A63B 2220/05; G06K 9/00342

See application file for complete search history.

(56) References Cited

U.S. PATENT DOCUMENTS

| | | | |
|---|---|---|---|
| 2005/0101448 A1* | 5/2005 | He | A63B 22/02 482/54 |
| 2011/0105966 A1* | 5/2011 | Kazerooni | A61H 3/008 601/35 |
| 2011/0275043 A1 | 11/2011 | Liu | |
| 2012/0301663 A1 | 11/2012 | Koike et al. | |
| 2014/0163435 A1* | 6/2014 | Yamamoto | A61H 1/0244 601/35 |
| 2014/0212243 A1* | 7/2014 | Yagi | A61H 1/024 414/2 |
| 2015/0342820 A1* | 12/2015 | Shimada | A63B 21/4011 482/69 |
| 2015/0366738 A1* | 12/2015 | Endo | A61H 3/00 482/4 |
| 2016/0235615 A1* | 8/2016 | Yamamoto | A61H 1/0255 |
| 2017/0027803 A1* | 2/2017 | Agrawal | A61B 5/224 |

FOREIGN PATENT DOCUMENTS

| | | |
|---|---|---|
| KR | 10-2014-0017148 | 2/2014 |
| WO | WO 2006/017926 A1 | 2/2006 |
| WO | WO 2011/118143 A1 | 9/2011 |
| WO | WO 2015/164421 | 10/2015 |

* cited by examiner

WALKING TRAINING APPARATUS AND WALKING TRAINING METHOD THEREFOR

CROSS-REFERENCE TO RELATED APPLICATIONS

This application is based upon and claims the benefit of priority from Japanese patent application No. 2015-157349, filed on Aug. 7, 2015, the entire contents of which are incorporated herein by reference in entirety.

BACKGROUND OF THE DISCLOSURE

1. Field of the Disclosure

The present application relates to a walking training apparatus by which a user does a walking training and a walking training method therefor.

2. Description of Related Art

For example, the applicant of the present application has proposed a walking training apparatus including a walking assistance apparatus that is attached to a leg of a user and assists walking performed by the user (see Japanese Unexamined Patent Application Publication No. 2015-223294).

Here, assume a configuration in which first pulling means for pulling one of the walking assistance apparatus and a user's leg upward and forward, and second pulling means for pulling one of the walking assistance apparatus and the user's leg upward and forward are further added, and the resultant force of the vertically-upward components of the pulling forces applied by the first and second pulling means is roughly equal to the weight of the walking assistance apparatus so that the load caused by the gravitational force of the walking assistance apparatus exerted on the user's leg is reduced. The present inventors have found that the following problem occurs in this configuration. That is, the timing of the start of swinging of a leg in walking is also the timing at which the user reverses his/her leg's motion from the backward motion to the forward motion. Therefore, the leg to which the walking assistance apparatus is attached receives the backward inertial force from the walking assistance apparatus at this reverse timing. However, although the above-described walking training apparatus reduces the load on user's walking caused by the gravitational force of the walking assistance apparatus, it does not reduce the above-described load caused by the inertial force. Therefore, an excessive load is exerted on the leg to which the walking assistance apparatus is attached at the start of swinging of that leg. Meanwhile, it is conceivable to simply increase the pulling force applied by the pulling means in order to reduce the above-described load. However, in such a case, the leg could be easily lifted inadvertently, making the landing of the leg unstable and preventing the user from doing a stable walking training.

SUMMARY

The present disclosure has been made in view of the above-described problems and one of the main objects thereof is to provide a walking training apparatus and a walking training method therefor capable of reducing the load exerted on a leg to which a walking assistance apparatus is attached at the start of swinging of that leg or during the swinging period thereof.

A first exemplary aspect of the present disclosure is a walking training apparatus includes a walking assistance apparatus attached to a leg of a user, the walking assistance apparatus being configured to assist the user to walk, a first pulling mechanism to pull the leg upward and forward directly or through the walking assistance apparatus, and a controller configured to control the first pulling mechanism so that a vertically-upward component of a pulling force applied by the first pulling mechanism reduces a weight of the walking assistance apparatus. The walking training apparatus further includes at least one of a joint angle detector disposed in the walking assistance apparatus and an image pickup device to take an image of the leg of the user. The controller is configured to make the first pulling mechanism generate an additional pulling force in addition to the pulling force at a start of forward swinging of the leg or during a swinging period of the leg in a walking motion of the user, by using information detected by at least one of the joint angle detector and the image pickup device. According to this aspect, the load exerted on the leg to which the walking assistance apparatus is attached can be reduced at the start of swinging of that leg or during the swinging period thereof.

In an aspect, the walking training apparatus may further include a second pulling mechanism to pull the leg upward and backward directly or through the walking assistance apparatus. The controller may be configured to control the first and second pulling mechanisms so that a resultant force of vertically-upward components of pulling forces applied by the first and second pulling mechanisms reduces the weight of the walking assistance apparatus, and control the first and second pulling mechanisms so that the first and second pulling mechanisms generate an additional pulling force in addition to the resultant force at the start of forward swinging of the leg or during the swinging period of the leg in the walking motion of the user, by using information detected by at least one of the joint angle detector and the image pickup device. According to this aspect, the vertically-upward components and the horizontally-forward components of the pulling forces applied by the first and second pulling mechanisms can be accurately controlled independently of each other. As a result, it is possible to, while reducing the load caused by the gravitational force of the walking assistance apparatus, reduce the load exerted on the leg to which the walking assistance apparatus is attached at the start of swinging of that leg or during the swinging period thereof in a more optimal manner.

In an aspect, the walking training apparatus may further include a treadmill on which the user performs a walking training, and a speed detector to detect a speed of the treadmill. The controller may be configured to make the first pulling mechanism generate an additional pulling force in addition to the pulling force at the start of forward swinging of the leg or during the swinging period of the leg in the walking motion of the user, by using information detected by at least one of the joint angle detector, the image pickup device, and the speed detector. According to this aspect, it is possible to detect the start of swinging of the leg to which the walking assistance apparatus is attached or the swinging period thereof by using the information detected by at least one of the joint angle detector, the image pickup device, and the speed detector and thereby reduce the load exerted on the leg at the start of swinging of the leg or during the swinging period thereof.

In an aspect, the walking training apparatus may further include a treadmill on which the user performs a walking training, and a speed detector to detect a speed of the treadmill. The controller may be configured to control the first and second pulling mechanisms so that the first and second pulling mechanisms generate an additional pulling force in addition to the resultant force at the start of forward swinging of the leg or during the swinging period of the leg in the walking motion of the user, by using information detected by at least one of the joint angle detector, the image pickup device, and the speed detector. According to this aspect, it is possible to detect the start of swinging of the leg to which the walking assistance apparatus is attached or the swinging period thereof by using the information detected by at least one of the joint angle detector, the image pickup device, and the speed detector, and accurately control the vertically-upward components and the horizontally-forward components of the pulling forces applied by the first and second pulling mechanisms independently of each other at the start of swinging of the leg or during the swinging period thereof. Therefore, the load exerted on the leg can be reduced even further.

Another exemplary aspect of the present disclosure is a walking training method for a walking training apparatus. The walking training apparatus includes a walking assistance apparatus attached to a leg of a user, the walking assistance apparatus being configured to assist the user to walk, a first pulling mechanism to pull the leg upward and forward directly or through the walking assistance apparatus, and a controller. The walking training method includes controlling the first pulling mechanism with the controller so that a vertically-upward component of a pulling force applied by the first pulling mechanism reduces a weight of the walking assistance apparatus, and generating, with the first pulling mechanism, an additional pulling force in addition to the pulling force at a start of forward swinging of the leg or during a swinging period of the leg in a walking motion of the user, by using information detected by at least one of a joint angle detector disposed in the walking assistance apparatus and an image pickup device to take an image of the leg of the user. According to this aspect, the load exerted on the leg to which the walking assistance apparatus is attached can be reduced at the start of swinging of that leg or during the swinging period thereof.

According to the present disclosure, it is possible to provide a walking training apparatus and a walking training method therefor capable of reducing the load exerted on a leg to which a walking assistance apparatus is attached at the start of swinging of that leg or during the swinging period thereof.

The above and other objects, features and advantages of the present disclosure will become more fully understood from the detailed description given hereinbelow and the accompanying drawings, which are given by way of illustration only, and thus are not to be considered as limiting the present disclosure.

DESCRIPTION OF THE EXEMPLARY EMBODIMENTS

Exemplary embodiments according to the present disclosure are explained hereinafter with reference to the drawings.

Figure 1:
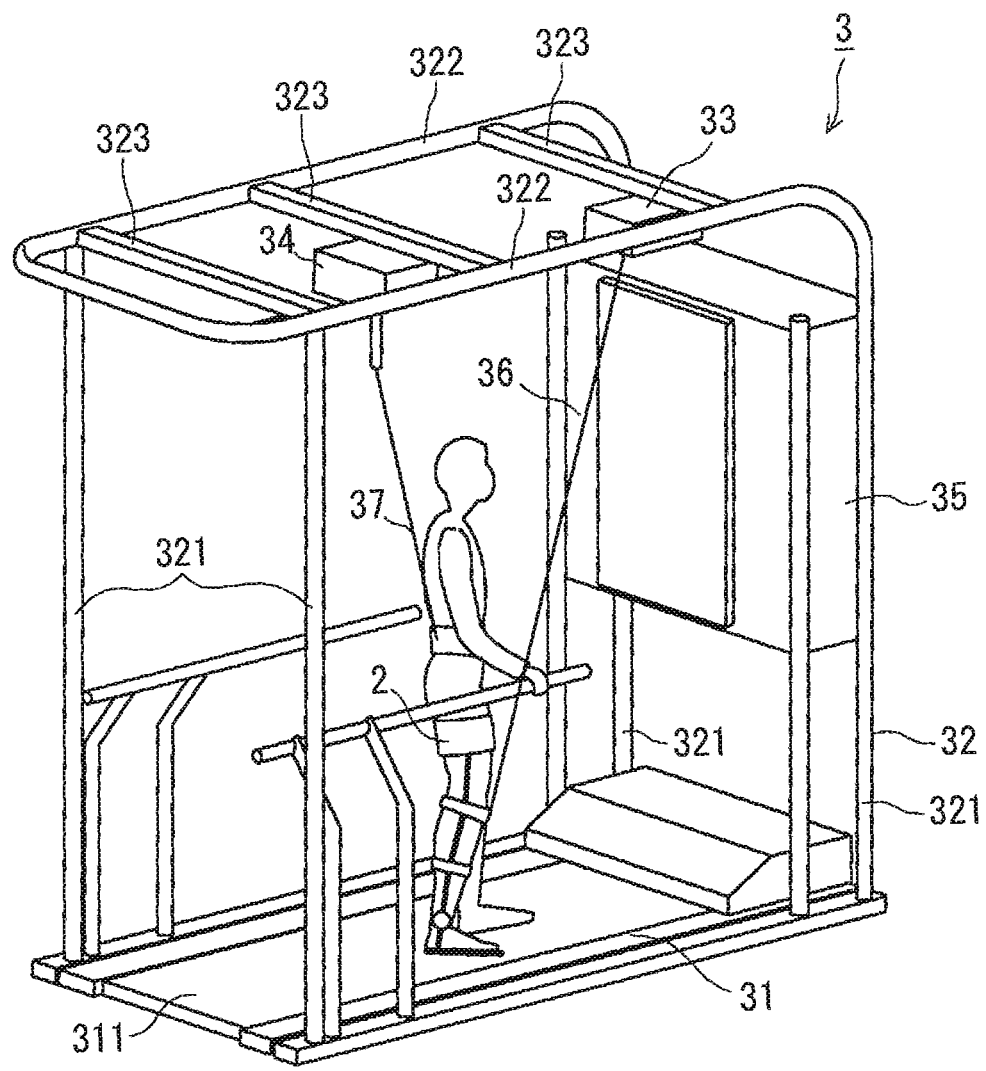
FIG. 1 is a perspective view showing a schematic configuration of a walking training apparatus according to an exemplary embodiment of the present disclosure.

FIG. 1 is a perspective view showing a schematic configuration of a walking training apparatus according to an exemplary embodiment of the present disclosure. A walking training apparatus according to this exemplary embodiment is, for example, an apparatus by which a user such as a patient having hemiplegia caused by a stroke does a walking training. The walking training apparatus includes a walking assistance apparatus 2 attached to the user's leg and a training apparatus 3 by which the user does a walking training.

Figure 2:
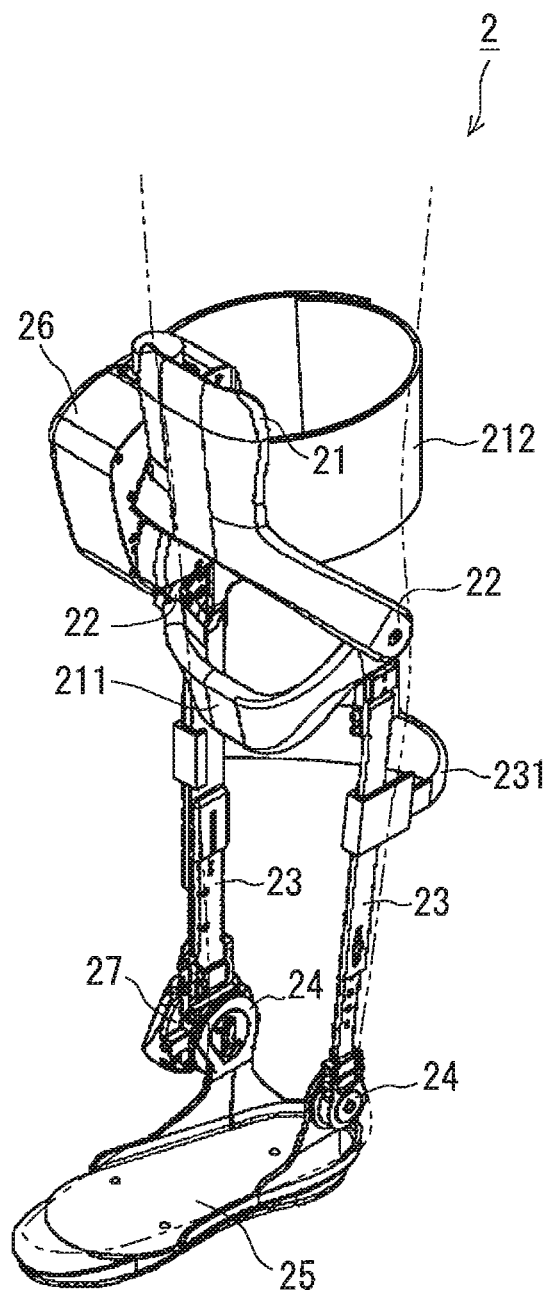
FIG. 2 is a perspective view showing a schematic configuration of a walking assistance apparatus.

The walking assistance apparatus 2 is, for example, attached to a diseased leg of a user who does a walking training and assists walking of the user (FIG. 2). The walking assistance apparatus 2 includes an upper thigh frame 21, a lower thigh frame 23 connected to the upper thigh frame 21 through a knee joint part 22, a sole frame 25 connected to the lower thigh frame 23 through an ankle joint part 24, a motor unit 26 that rotationally drives the knee joint part 22, and an adjustment mechanism 27 that adjusts the movable range of the ankle joint part 24. Note that the above-described configuration of the walking assistance apparatus 2 is merely an example and the configuration of the walking assistance apparatus 2 is not limited to such an example. For example, the walking assistance apparatus 2 may include another motor unit that rotationally drives the ankle joint part 24.

The upper thigh frame 21 is attached to the upper thigh of the user's leg and the lower thigh frame 23 is attached to the lower thigh of the user's leg. The upper thigh frame 21 is, for example, equipped with an upper thigh harness 212 for fixing the upper thigh. The upper thigh harness 212 is fixed to the upper thigh by using, for example, Velcro (registered trademark). In this way, it is possible to prevent the walking assistance apparatus 2 from being displaced from the user's leg in the horizontal direction or the vertical direction. The upper thigh frame 21 is equipped with a horizontally-extending and horizontally-long first frame 211 for connecting with a wire 36 of a first pulling unit 33 (which is described later). The lower thigh frame 23 is equipped with a horizontally-extending and horizontally-long second frame 231.

Note that the above-described connecting part of the first pulling unit 33 is merely an example and the connection of the first pulling unit 33 is not limited to such an example. For example, the wire 36 of the first pulling unit 33 may be connected to the upper thigh harness 212 and the pulling point of the first pulling unit 33 can be disposed at an arbitrary position in the walking assistance apparatus 2.

The motor unit 26 rotationally drives the knee joint part 22 according to the walking motion of the user and thereby assists the walking of the user. Note that the above-described configuration of the walking assistance apparatus 2 is merely an example and the configuration of the walking assistance apparatus 2 is not limited to such an example. Any walking assistance apparatus capable of being attached to a user's leg and assisting walking of the user can be applied.

The training apparatus 3 includes a treadmill 31, a frame main body 32, first and second pulling units 33 and 34, and a control device 35. The treadmill 31 rotates a ring-shaped belt 311. The user gets on the belt 311 and walks on the belt 311 according to the movement of the belt 311. By doing so, the user does a walking training.

The frame main body 32 includes two pairs of pillar frames 321 vertically disposed on the treadmill 31, a pair of lengthwise frames 322 extending in the lengthwise direction and connected to respective pillar frames 321, and three crosswise frames 323 extending in the crosswise direction and connected to each of the lengthwise frames 322. Note that the configuration of the above-described frame main body 32 is not limited to this example. Any frame structure can be adopted for the frame main body 32, provided that the first and second pulling units (which are described later) can be appropriately fixed to the frame main body 32.

In the front crosswise frame 323, the first pulling unit 33 that pulls the wire 36 upward and forward is provided. The first pulling unit 33 is a specific example of the first pulling means. The first pulling unit 33 includes, for example, a mechanism for winding up and back the wire 36, a motor that drives the mechanism, and so on. One end of the wire 36, which is pulled by the first pulling unit 33, is connected to the walking assistance apparatus 2. The first pulling unit 33 pulls the walking assistance apparatus 2 upward and forward through the wire 36.

The vertically-upward component of the pulling force applied by the first pulling unit 33 supports the weight of the walking assistance apparatus 2. The horizontally-forward component of the pulling force applied by the first pulling unit 33 assists the start of swinging of the leg. In this way, the walking load of the user in the walking training can be reduced.

The second pulling unit 34 is disposed in the rear crosswise frame 323 and pulls a wire 37 upward. One end of the wire 37 is connected to, for example, a belt attached to or near the user's waist. The second pulling unit 34 includes, for example, a mechanism for winding up and back the wire 37, a motor that drives the mechanism, and so on. The second pulling unit 34 pulls the user's waist upward through the wire 37. In this way, the load on the user caused by the weight of the user himself/herself can be reduced. Each of the first and second pulling units 33 and 34 is connected to the control device 35 through a wiring line or the like.

The control device 35 is a specific example of the control means. The control device 35 controls each of the pulling forces applied by the first and second pulling units 33 and 34, the driving of the treadmill 31, and the walking assistance apparatus 2. For example, the control device 35 is formed by hardware mainly using a microcomputer including a CPU (Central Processing Unit) that performs arithmetic processing, control processing, and so on, a ROM (Read Only Memory) that stores an arithmetic program, a control program and so on to be executed by the CPU, a RAM (Random Access Memory) that stores various data and so on, and an interface unit (I/F) that externally receives and outputs signals. The CPU, the ROM, the RAM, and the interface unit are connected with each other through a data bus or the like.

Figure 3:
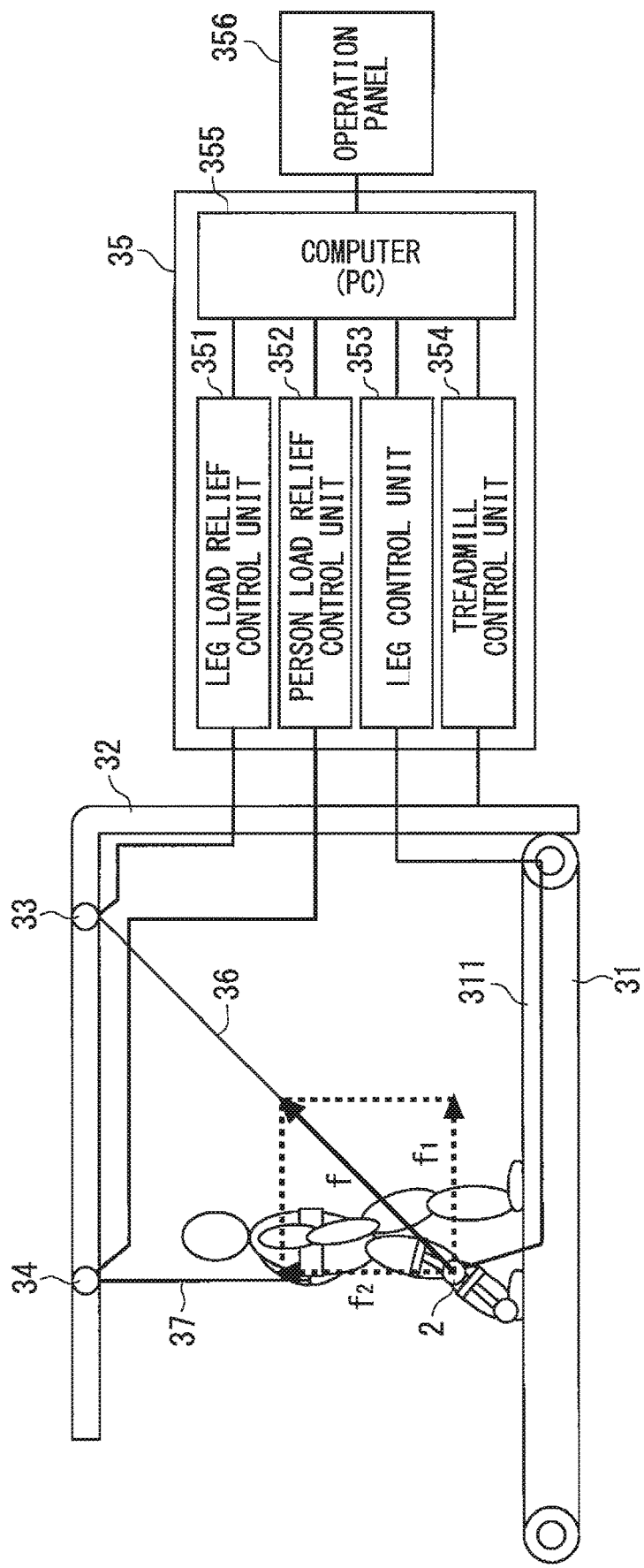
FIG. 3 is a block diagram showing a schematic system configuration of a control device according to an exemplary embodiment of the present disclosure.

FIG. 3 is a block diagram showing a schematic system configuration of the control device according to this exemplary embodiment.

The control device 35 includes, for example, a leg load relief control unit 351 that controls the first pulling unit 33, a person load relief control unit 352 that controls the second pulling unit 34, a leg control unit 353 that controls the walking assistance apparatus 2, a treadmill control unit 354 that controls the treadmill 31, a computer or a PC (Personal Computer) 355 that controls these units, and an operation panel 356 for operating the computer 355. The operation panel 356 displays information such as a training instruction, a training menu, and training information (such as walking speed and biological information). The operation panel 356 is formed, for example, as a touch panel, and a user can enter various types of information (e.g., pulling forces applied by the first and second pulling units 33 and 34) through the operation panel 356.

Incidentally, the timing of the start of swinging of a leg in walking is also the timing at which the user reverses his/her leg's motion from the backward motion to the forward motion. Therefore, the leg to which the walking assistance apparatus is attached receives the backward inertial force from the walking assistance apparatus at this reverse timing. However, although the related art walking training apparatus reduces the load on user's walking caused by the gravitational force of the walking assistance apparatus, it does not reduce the above-described load caused by the inertial force. Therefore, an excessive load is exerted on the leg of the user (in particular, a patient having hemiplegia caused by a stroke or the like) at the start of swinging of the leg in the walking. Meanwhile, it is conceivable to simply increase the pulling force applied by the pulling unit in order to reduce the above-described load. However, in such a case, the leg could be easily lifted inadvertently, making the landing of the leg unstable and preventing the user from doing a stable walking training.

In contrast to this, the control device 35 according to this exemplary embodiment controls the first pulling unit 33 so that the vertically-upward component f2 of the pulling force f applied by the first pulling unit 33 reduces the gravitational force of the walking assistance apparatus. Further, the control device 35 controls the first pulling unit 33 so that the first pulling unit 33 increases the pulling force f and thereby generates an additional pulling force at the start of swinging of the leg to which the walking assistance apparatus 2 is attached or during the swinging period of the leg.

As described above, according to this exemplary embodiment, the load caused by the gravitational force of the walking assistance apparatus 2 on the walking of the user can be reduced by controlling the first pulling unit 33 so that the vertically-upward component f2 of the pulling force f applied by the first pulling unit 33 reduces the gravitational force of the walking assistance apparatus. Further, according to this exemplary embodiment, the load caused by the inertial force of the walking assistance apparatus 2 can be reduced at the start of swinging of the leg or during the swinging period of the leg by increasing the pulling force f applied by the first pulling unit 33 and thereby increasing its horizontally-forward component f1 at the start of swinging of the leg or during the swinging period of the leg. That is, the load exerted on the leg to which the walking assistance apparatus 2 is attached can be reduced at the start of swinging of that leg or during the swinging period of the leg.

Figure 4:
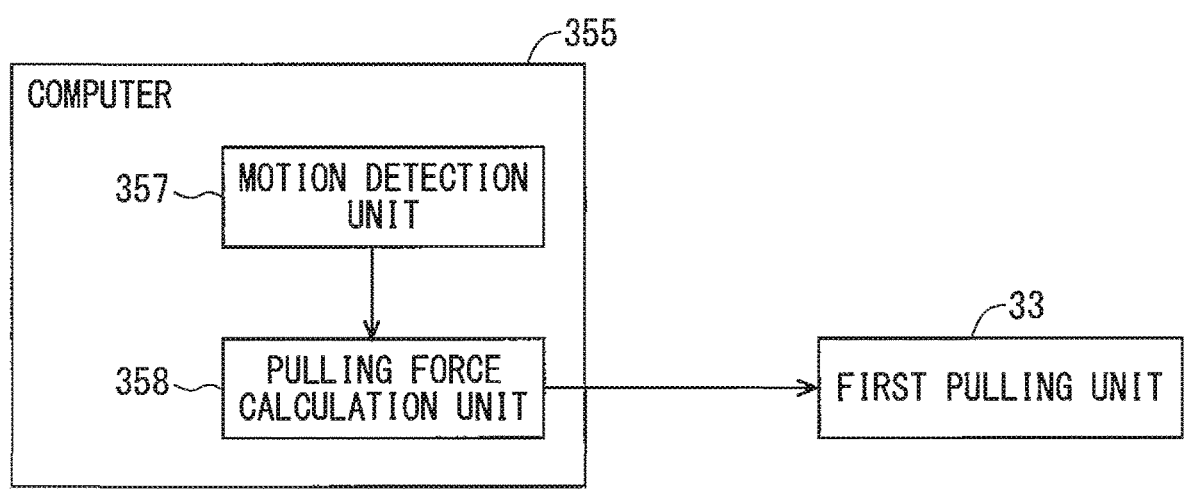
FIG. 4 is a block diagram showing a schematic system configuration of a computer according to an exemplary embodiment of the present disclosure.

FIG. 4 is a block diagram showing a schematic system configuration of a computer according to this exemplary embodiment. A computer 355 according to this exemplary embodiment includes a motion detection unit 357 that detects the start of forward swinging of a leg to which the walking assistance apparatus 2 is attached and a pulling force calculation unit 358 that calculates a pulling force command value for the first pulling unit 33.

For example, the motion detection unit 357 detects information about the motion or the position of the leg or the foot to which the walking assistance apparatus 2 is attached by using a camera (a specific example of the image pickup means). The motion detection unit 357 detects the start of forward swinging of the leg to which the walking assistance apparatus 2 is attached based on the detected information. Alternatively, the motion detection unit 357 detects information about the motion or the position of the walking assistance apparatus 2 by using a camera and detects the start of forward swinging of the leg to which the walking assistance apparatus 2 is attached based on the detected information.

The motion detection unit 357 detects the start of forward swinging of the leg to which the walking assistance apparatus 2 is attached based on a change in the angle of the knee joint part over time detected by an angle sensor (a specific example of the knee angle detection means) provided in the knee joint part 22 of the walking assistance apparatus 2. More specifically, the motion detection unit 357 detects the start of swinging of the leg when the motion detection unit 357 determines that the detected angle of the knee joint part enters a change range corresponding to a swinging starting motion based on a change in the angle of the knee joint part over time detected by the angle sensor.

The motion detection unit (a specific example of the speed detection means) 357 detects the moving speed of the belt 311 of the treadmill 31 and calculates the walking cycle of the user based on the detected moving speed. Then, the motion detection unit 357 detects the start of forward swinging of the leg to which the walking assistance apparatus 2 is attached based on the calculated walking cycle of the user. The relation between the walking cycle and the moving speed of the belt 311 of the treadmill 31 can be experimentally obtained in advance (for example, the walking cycle is expressed as a monotonous phenomenon function including the moving speed of the belt 311 of the training apparatus 3 as its variable). Note that the above-described method for detecting the start of swinging of the leg is merely an example. That is, the detection method is not limited to such an example and an arbitrary detection method can be applied. When the motion detection unit 357 detects the start of forward swinging of the leg to which the walking assistance apparatus 2 is attached, the motion detection unit 357 outputs a detection signal to the pulling force calculation unit 358.

The pulling force calculation unit 358 calculates a pulling force command value for the first pulling unit 33 and outputs the calculated pulling force command value to the first pulling unit 33. The first pulling unit 33 pulls the wire 36 of the walking assistance apparatus 2 according to the pulling force command value output from the pulling force calculation unit 358. At this point, the vertically-upward component f2 of the pulling force f applied by the first pulling unit 33 supports the weight of the walking assistance apparatus 2. The horizontally-forward component f1 of the pulling force f applied by the first pulling unit 33 assists the start of swinging of the leg. That is, the pulling force command value is set so that, for the normal walking motion of the user, the vertically-upward component f2 of the pulling force f supports the weight of the walking assistance apparatus 2 and the horizontally-forward component f1 of the pulling force f optimally assists the start of swinging of the leg.

Figure 5:
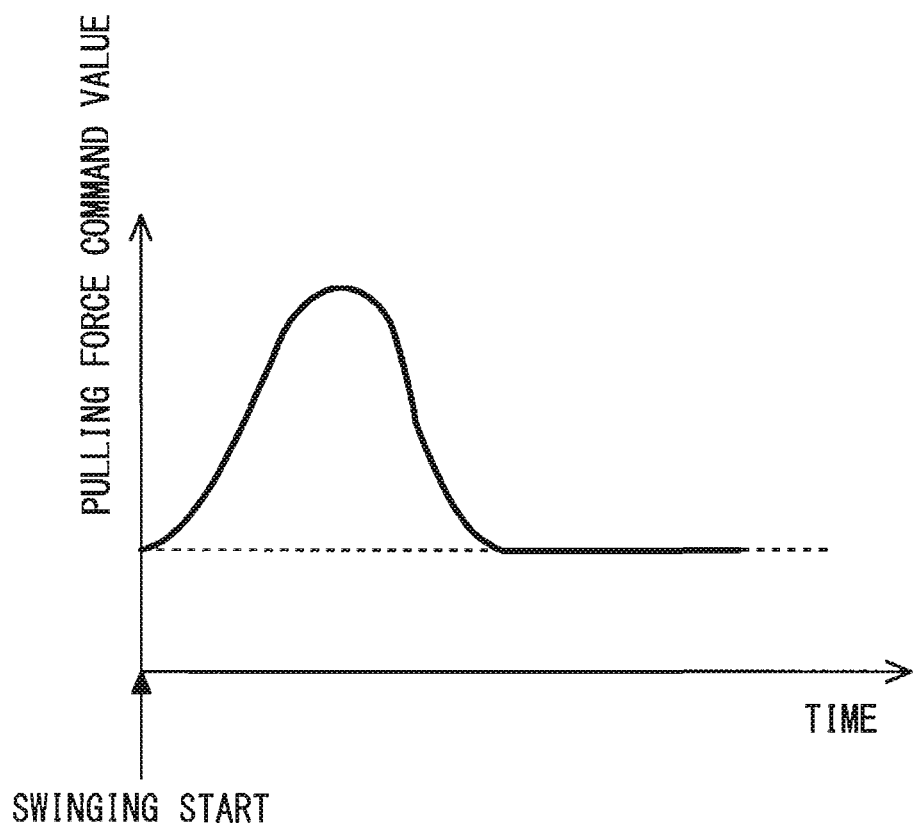
FIG. 5 shows variations in a pulling force command value at the start of swinging of a leg.

However, as described previously, the leg receives the backward inertial force from the walking assistance apparatus 2 at the start of swinging of the leg in the walking and hence a load higher than that exerted in a normal walking motion is exerted on the leg at the start of swinging of the leg. To cope with this, when the pulling force calculation unit 358 according to this exemplary embodiment receives a detection signal from the motion detection unit 357, the pulling force calculation unit 358 increases the pulling force command value from its normal value for a predetermined time period (FIG. 5). As described above, the pulling force f for the first pulling unit 33 is increased only when the leg receives the inertial force at the start of swinging of the leg. In this way, the load caused by the inertial force at the start of swinging of the leg can be reduced.

When the pulling force calculation unit 358 receives a detection signal from the motion detection unit 357, the pulling force calculation unit 358 sharply increases the pulling force command value in a short time, for example, in a pulsed manner. Note that the increment of the pulling force command value may be set, for example, based on the inertial force of the walking assistance apparatus 2 calculated from the moving speed of the belt 311 of the treadmill 31. When a predetermined time has elapsed after the start of swinging of the leg is detected, the pulling force calculation unit 358 outputs the normal pulling force command value to the first pulling unit 33.

Figure 6:
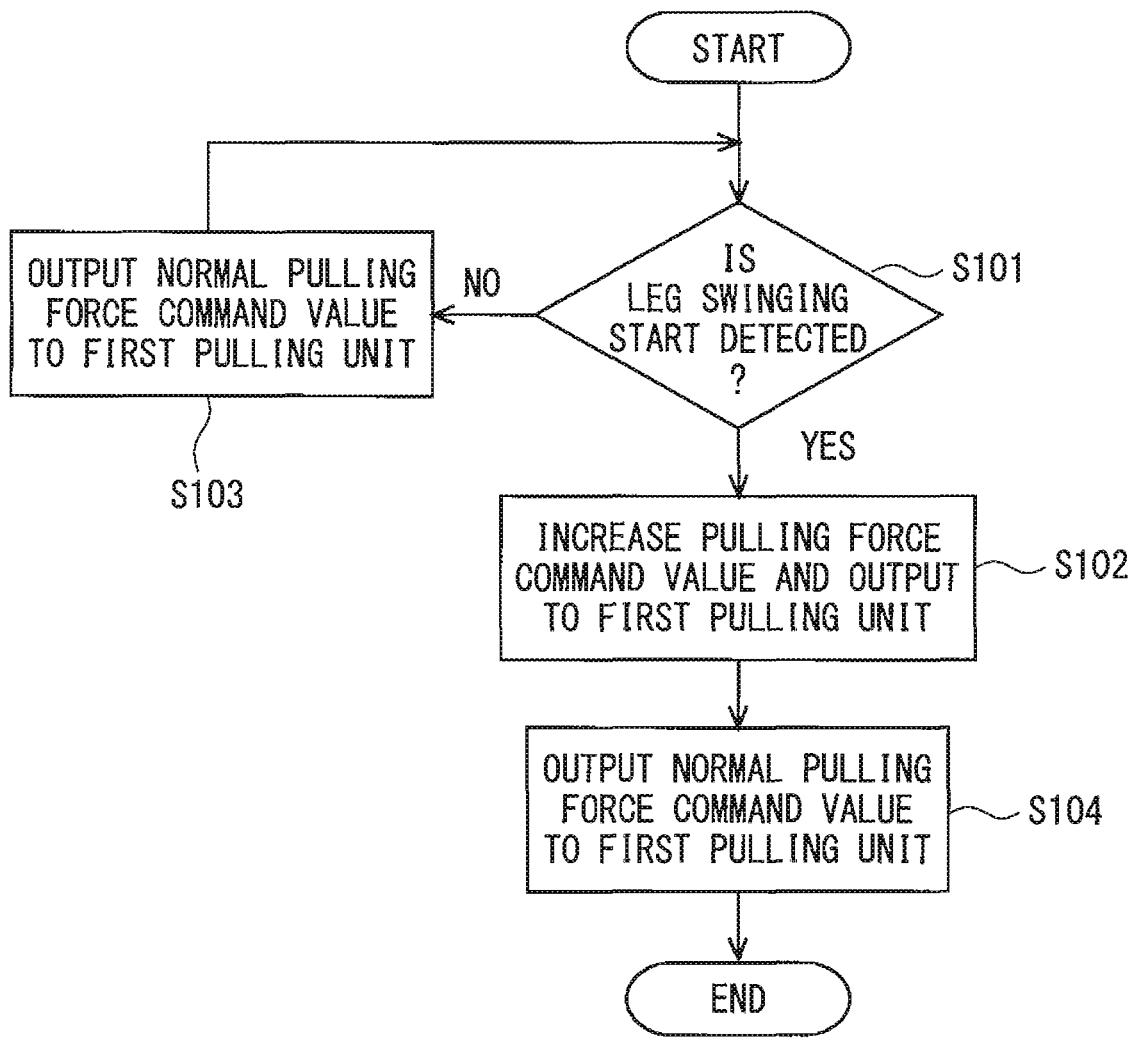
FIG. 6 is a flowchart showing a flow of a walking training method according to an exemplary embodiment of the present disclosure.

FIG. 6 is a flowchart showing a flow of a walking training method according to this exemplary embodiment.

The motion detection unit 357 detects the start of forward swinging of the leg to which the walking assistance apparatus 2 is attached based on, for example, a change in the pressure distribution on the sole over time (step S101).

When the motion detection unit 357 detects the start of forward swinging of the leg to which the walking assistance apparatus 2 is attached (Yes at step S101), the pulling force calculation unit 358 increases the pulling force command value and outputs the increased pulling force command value to the first pulling unit 33 (step S102). On the other hand, when the motion detection unit 357 does not detect the start of forward swinging of the leg to which the walking assistance apparatus 2 is attached (No at step S101), the pulling force calculation unit 358 outputs the normal pulling force command value to the first pulling unit 33 (step S103). The process then returns to the above-described step S101.

When a predetermined time has elapsed after the start of swinging of the leg is detected, the pulling force calculation unit 358 outputs the normal pulling force command value to the first pulling unit 33 (step S104).

As described above, the walking training apparatus according to this exemplary embodiment controls the first pulling unit 33 so that the vertically-upward component f2 of the pulling force f applied by the first pulling unit 33 reduces the gravitational force of the walking assistance apparatus. For example, the vertically-upward component f2 of the pulling force f applied by the first pulling unit 33 is made equal to the gravitational force of the walking assistance apparatus 2 or equal to a half of the gravitational force of the walking assistance apparatus 2.

Further, the pulling force f applied by the first pulling unit 33 is increased at the start of swinging of the leg. In this way, it is possible to reduce the load caused by the inertial force of the walking assistance apparatus 2 at the start of swinging of the leg and thereby reduce the load exerted on the leg at the start of swinging of the leg.

Note that the present disclosure is not limited to the above-described exemplary embodiments, and various modifications can be made without departing from the spirit and scope of the present disclosure.

Figure 7:
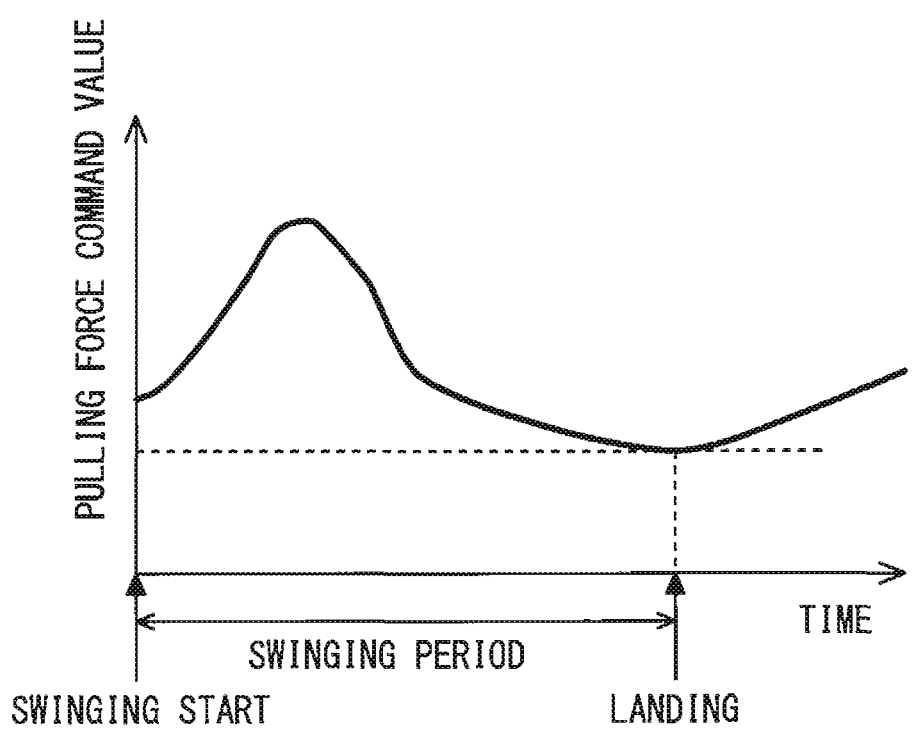
FIG. 7 shows variations in a pulling force command value at the start of swinging of a leg.

In the above-described exemplary embodiment, when the motion detection unit 357 of the computer 355 detects the start of forward swinging of the leg to which the walking assistance apparatus 2 is attached, the pulling force calculation unit 358 may increase the pulling force command value and then gradually decrease the pulling force command value (FIG. 7). For example, the pulling force calculation unit 358 increases the pulling force command value in a pulsed manner when the start of swinging of the leg is detected. After that, the pulling force calculation unit 358 gradually decreases the pulling force command value and returns the pulling force command value to the normal value when the swinging period has been finished (when the sole frame 25 lands on the ground). In this case, the pulling force calculation unit 358 may increase the pulling force command value as the pulling force exerted on the wire 36 of the walking assistance apparatus 2 increases during this swinging period.

In this way, it is possible to continuously add a pulling force larger than the normal pulling force in the swinging direction during the swinging period (the period in which the user is swinging his/her leg). As a result, it is possible to reduce not only the load caused by the inertial force but also the overall load of the swinging motion.

Figure 8:
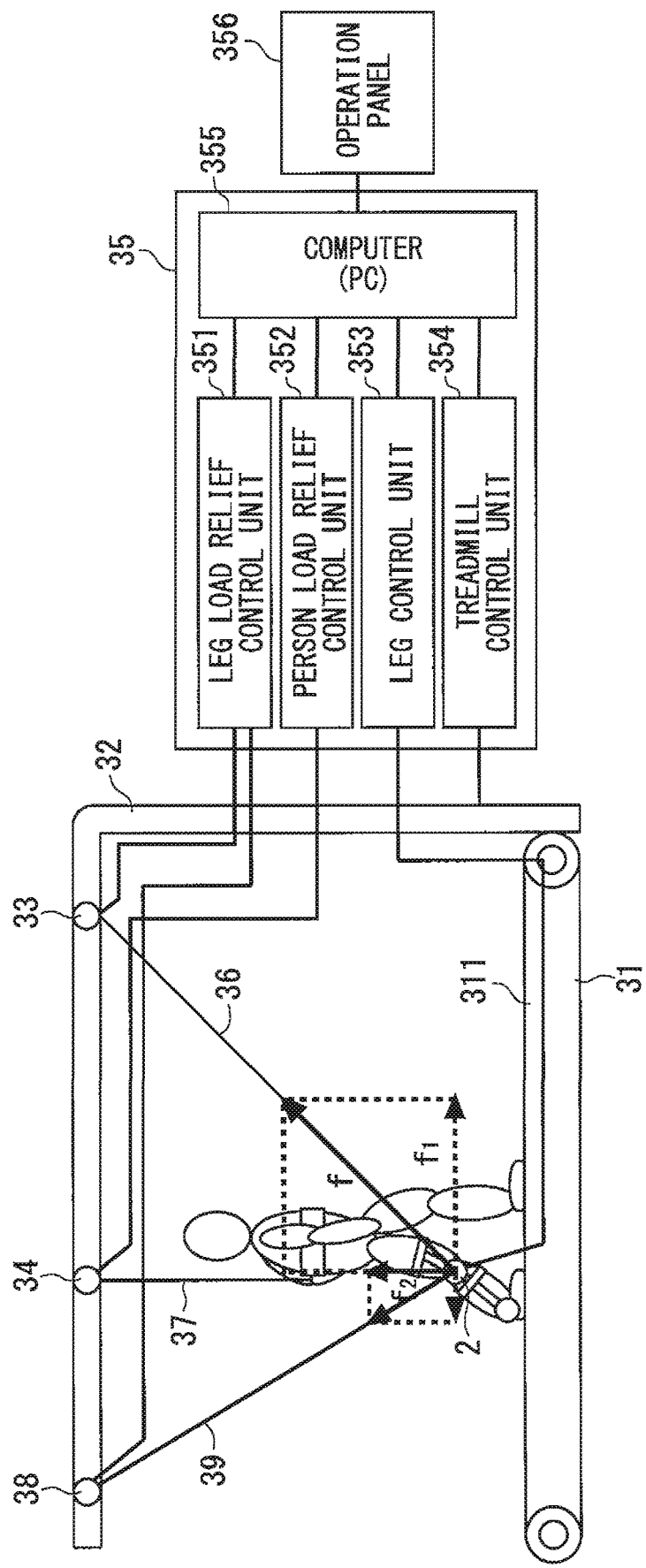
FIG. 8 is a block diagram showing a schematic system configuration of a control device according to an exemplary embodiment of the present disclosure.

The above-described exemplary embodiment may have a configuration in which a third pulling unit 38 that pulls the walking assistance apparatus upward and backward through a wire 39 is provided in the crosswise frame 323 of the frame main body 32 (FIG. 8). The third pulling unit 38 is a specific example of the second pulling means. The resultant force of the vertically-upward components of the pulling forces applied by the first and third pulling units 33 and 38 supports the weight of the walking assistance apparatus 2. Further, the resultant force of the horizontal components of the pulling forces applied by the first and third pulling units 33 and 38 assists the start of swinging of the leg.

The pulling force calculation unit 358 outputs a pulling force command value that makes the resultant force of the vertically-upward components of the pulling forces applied by the first and third pulling units 33 and 38 equal to the gravitational force of the walking assistance apparatus 2 to the first and third pulling units 33 and 38. Further, when the pulling force calculation unit 358 receives a detection signal from the motion detection unit 357, the pulling force calculation unit 358 increases the pulling force command value from its normal value for a predetermined time period and outputs the increased pulling force command value to the first pulling unit 33. At this point, the pulling force calculation unit 358 is outputting the normal pulling force command value (pulling force command value=constant) to the third pulling unit 38. However, the present disclosure is not limited to such a configuration and method. That is, the pulling force command value for the third pulling unit 38 may be changed in a manner similar to the pulling force command value for the first pulling unit 33. In other words, the pulling force calculation unit 358 changes the pulling force command values for the first and third pulling units 33 and 38 and thereby increases the horizontally-forward components of the pulling forces applied by the first and third pulling units 33 and 38 at the start of swinging of the leg. In this way, the vertically-upward components and the horizontally-forward components of the pulling forces applied by the first and third pulling units 33 and 38 can be accurately controlled independently of each other. As a result, it is possible to, while reducing the load caused by the gravitational force of the walking assistance apparatus, reduce the load exerted on the leg to which the walking assistance apparatus 2 is attached at the start of swinging of that leg in a more optimal manner.

Further, when the start of swing-back of the leg to which the walking assistance apparatus 2 is attached in the backward direction is detected, the control device 35 may control the first and third pulling units 33 and 38 so that the horizontal components of the pulling forces applied by the first and third pulling units 33 and 38 are increased. In this way, the load caused by the inertial force of the walking assistance apparatus 2 at the start of swing-back of the leg can also be reduced.

In the above-described exemplary embodiment, the training apparatus 3 may not include the frame main body 32. In such a case, the first and second pulling units may be, for example, disposed (or mounted) on the wall or the ceiling.

Although the wire 36 of the first pulling unit 33 is connected to the walking assistance apparatus 2 in the above-described exemplary embodiment, the present disclosure is not limited to such a configuration. For example, the wire 36 of the first pulling unit 33 may be connected to the user's leg through a fixture such as a belt and ring. Further, the wire 36 of the first pulling unit 33 may be connected to both the walking assistance apparatus 2 and the user's leg.

Although the user outfitted with the walking assistance apparatus 2 walks on the treadmill 31 in the above-described exemplary embodiment, the present disclosure is not limited to such a configuration. The present disclosure may be applied to a configuration in which a user outfitted with the walking assistance apparatus 2 walks on a stationary road surface and the first pulling unit 33 is moved according to the movement of the user.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A walking training apparatus comprising:
   a walking assistance apparatus attached to a leg of a user, the walking assistance apparatus being configured to assist the user to walk;
   a first pulling unit including a first wire configured to be attached to the leg of the user at a first end of the first wire so as to pull the leg upward and forward directly or through the walking assistance apparatus;
   a controller configured to control the first pulling unit so that a vertically-upward component of a pulling force applied by the first pulling unit reduces a weight of the walking assistance apparatus; and
   at least one of a joint angle sensor, disposed in the walking assistance apparatus, to detect an angle of a knee joint part, and a camera to take an image of the leg of the user,
   wherein the controller is configured to:
   detect a start of forward swinging of the leg in a walking motion of the user, the start of forward swinging of the leg being a timing at which the user reverses a motion of the leg of the user from a backward motion to a forward motion,
   when the controller does not detect the start of forward swinging of the leg in the walking motion of the user, control the first pulling unit to generate a first pulling force, and when the controller does detect the start of forward swinging of the leg in the walking motion of the user, make the first pulling unit generate an additional pulling force in addition to the first pulling force for a predetermined time period, and make the first pulling unit generate the first pulling force after the predetermined time period has elapsed, the predetermined time period being determined by using information detected by at least one of the joint angle sensor and the camera.

2. The walking training apparatus according to claim 1, further comprising:
a second pulling unit including a second wire configured to be attached to the leg of the user at a first end of the second wire so as to pull the leg upward and backward directly or through the walking assistance apparatus,
wherein the controller is configured to:
control the first and second pulling units so that a resultant force of vertically upward components of pulling forces applied by the first and second pulling units reduces the weight of the walking assistance apparatus, and
control the first and second pulling units so that the first and second pulling units generate the additional pulling force at the start of forward swinging of the leg in the walking motion of the user, by using information detected by at least one of the joint angle sensor and the camera.

3. The walking training apparatus according to claim 2, further comprising:
a treadmill on which the user performs a walking training; and
speed sensor to detect a speed of the treadmill,
wherein the controller is configured to control the first and second pulling units so that the first and second pulling units generate the additional puffing force at the start of forward swinging of the leg in the walking motion of the user, by using information detected by at least one of the joint angle sensor, the camera, and the speed sensor.

4. The walking training apparatus according to claim 1, further comprising:
a treadmill on which the user performs a walking training; and
a speed sensor to detect a speed of the treadmill,
the controller is configured to make the first pulling unit generate the additional pulling force at the start of forward swinging of the leg in the walking motion of the user, by using information detected by at least one of the joint angle sensor, the camera, and the speed sensor.

5. The walking training apparatus according to claim 1, wherein the controller is configured to control the first pulling unit so that a horizontally-forward component of the pulling force applied by the first pulling unit reduces a bad exerted on the leg to which the walking assistance apparatus is attached.

6. A walking training method comprising:
providing a walking training apparatus, the walking training apparatus including a walking assistance apparatus attached to a leg of a user, the walking assistance apparatus being configured to assist the user to walk, a first pulling unit including a first wire configured to be attached to the leg of the user at a first end of the first wire so as wherein a vertically-upward component of a pulling force applied by the first pulling unit reduces a weight of the walking assistance apparatus, and a controller;
detecting a start of forward swinging of the leg in a walking motion of the user to, the start of forward swinging of the leg being a timing at which the user reverses a motion of the leg of the user from a backward motion to a forward motion;
generating with the first pulling unit, when the start of forward swinging of the leg in the walking motion of the user has not been detected, a first pulling force; and
generating with the first pulling unit, when the start of forward swinging of the leg in the walking motion of the user has been detected, an additional pulling force in addition to the first pulling force for a predetermined time period, and generating, with the first pulling unit, the first pulling force after the predetermined time period has elapsed, the predetermined time period being determined by using information detected by at least one of a joint angle sensor, disposed in the walking assistance apparatus, to detect an angle of a knee joint part, and a camera to take an image of the leg of the user.

7. A walking training apparatus comprising:
a walking assistance apparatus attached to a leg of a user, the walking assistance apparatus being configured to assist the user to walk;
a first means for pulling the leg upward and forward directly or through the walking assistance apparatus;
means for controlling the first pulling means so that a vertically-upward component of a pulling force applied by the first pulling means reduces a weight of the walking assistance apparatus; and
at least one of means for detecting a joint angle, disposed in the walking assistance apparatus, to detect an angle of a knee joint part, and means for taking an image of the leg of the user,
wherein the means for controlling is configured to:
detect a start of forward swinging of the leg in a walking motion of the user, the start of forward swinging of the leg being a timing at which the user reverses a motion of the leg of the user from a backward motion to a forward motion,
when the control means does not detect the start of forward swinging of the leg in the walking motion of the user, control the first means for pulling to generate a first pulling force, and
when the control means does detect the start of forward swinging of the leg in the walking motion of the user, make the first means for pulling generate an additional pulling force in addition to the first pulling force for a predetermined time period, and make the first means for pulling generate the first pulling force after the predetermined time period has elapsed, the predetermined time period being determined by using information detected by at least one of the joint angle detection means and the means for taking the image.

* * * * *